(12) United States Patent
Zheng et al.

(10) Patent No.: US 8,910,244 B2
(45) Date of Patent: Dec. 9, 2014

(54) METHOD FOR ESTABLISHING IDENTITY MANAGEMENT TRUST, IDENTIFICATION PROVIDER AND SERVICE PROVIDER

(75) Inventors: Yijun Zheng, Shenzhen (CN); Zhaoji Lin, Shenzhen (CN); Jianyong Chen, Shenzhen (CN); Zhimeng Teng, Shenzhen (CN); Yuan Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/257,947

(22) PCT Filed: Mar. 23, 2010

(86) PCT No.: PCT/CN2010/071213

§ 371 (c)(1),
(2), (4) Date: Feb. 10, 2012

(87) PCT Pub. No.: WO2011/017922

PCT Pub. Date: Feb. 17, 2011

(65) Prior Publication Data

US 2012/0131642 A1   May 24, 2012

(30) Foreign Application Priority Data

Aug. 11, 2009  (CN) .......................... 2009 1 0164095

(51) Int. Cl.
| | |
|---|---|
| G06F 21/30 | (2013.01) |
| H04L 9/32 | (2006.01) |
| H04L 29/06 | (2006.01) |
| G06F 7/04 | (2006.01) |
| G06F 15/16 | (2006.01) |
| G06F 17/30 | (2006.01) |

(52) U.S. Cl.
CPC .............. *H04L 63/105* (2013.01); *G06F 21/30* (2013.01); *H04L 63/0884* (2013.01); *H04L 9/32* (2013.01); *H04L 63/0815* (2013.01)
USPC .......................................................... 726/3

(58) Field of Classification Search
CPC ........ G06F 21/30; H04L 9/32; H04L 63/0815
USPC ............................................................ 723/3
See application file for complete search history.

(56) References Cited

U.S. PATENT DOCUMENTS 7,784,085 B2 * 8/2010 Le Van Gong et al. ........... 726/3
7,784,092 B2 * 8/2010 Pearson et al. .................... 726/8
(Continued)

FOREIGN PATENT DOCUMENTS

| CN | 101453328 A | 6/2009 |
| CN | 101471777 A | 7/2009 |

(Continued)

OTHER PUBLICATIONS

International Search Report in international application No. PCT/CN2010/071213, mailed on Jun. 24, 2010.

(Continued)

*Primary Examiner* — Christopher Revak
*Assistant Examiner* — Jason C Chiang
(74) *Attorney, Agent, or Firm* — Oppedahl Patent Law Firm LLC

(57) ABSTRACT

A method for establishing an identity management trust, and an IDentification Provider (IDP) and a Service Provider (SP) are provided in the present disclosure. The method comprises: after receiving an access from a user, an SP determines whether an IDP to which the user attaches is located in a trust domain of the SP (S102); if the IDP to which the user attaches is not located in the trust domain of the SP, the SP inquires of an IDP in a local trust domain about the IDP to which the user attaches (S104); if the SP receives information of the IDP to which the user attaches, wherein the information is returned by an IDP in the local trust domain, the SP adds the IDP to which the user attaches to a temporary trust list to establish a trust for the IDP to which the user attaches (S106). The present disclosure can establish a trust relationship between an SP and any IDP in case of adding or not adding extra devices, ensuring the user to obtain desired services after logging on for one time.

8 Claims, 11 Drawing Sheets

(56) References Cited

U.S. PATENT DOCUMENTS

| | | | |
|---|---|---|---|
| 7,793,095 B2 * | 9/2010 | Hardt | 713/155 |
| 7,793,826 B2 * | 9/2010 | Kearney et al. | 235/379 |
| 7,860,883 B2 * | 12/2010 | Hinton et al. | 707/769 |
| 8,037,194 B2 * | 10/2011 | Yared et al. | 709/229 |
| 8,219,802 B2 * | 7/2012 | Doleh et al. | 713/155 |
| 2004/0002878 A1 * | 1/2004 | Maria Hinton | 705/7 |
| 2004/0064506 A1 * | 4/2004 | Ohara | 709/204 |
| 2005/0021964 A1 * | 1/2005 | Bhatnagar et al. | 713/175 |
| 2005/0044197 A1 * | 2/2005 | Lai | 709/223 |
| 2007/0097969 A1 * | 5/2007 | Regnier | 370/390 |
| 2007/0136786 A1 | 6/2007 | Le Van Gong et al. | |
| 2008/0010287 A1 * | 1/2008 | Hinton et al. | 707/10 |
| 2008/0010288 A1 * | 1/2008 | Hinton et al. | 707/10 |
| 2008/0021866 A1 * | 1/2008 | Hinton et al. | 707/2 |
| 2008/0021997 A1 | 1/2008 | Hinton | |
| 2008/0235513 A1 * | 9/2008 | Foster et al. | 713/185 |
| 2009/0089625 A1 * | 4/2009 | Kannappan et al. | 714/39 |
| 2010/0011421 A1 * | 1/2010 | Chari et al. | 726/5 |
| 2010/0071056 A1 * | 3/2010 | Cheng et al. | 726/16 |
| 2011/0103265 A1 * | 5/2011 | Dilipkumar Saklikar et al. | 370/259 |

FOREIGN PATENT DOCUMENTS

| | | |
|---|---|---|
| JP | H06276191 A | 9/1994 |
| JP | 2003087242 A | 3/2003 |
| JP | 2005538434 A | 12/2005 |
| JP | 2006164174 A | 6/2006 |
| JP | 2006276191 A | 10/2006 |
| JP | 2008506139 A | 2/2008 |
| JP | 2008226148 A | 9/2008 |
| WO | 2009093485 A1 | 7/2009 |

OTHER PUBLICATIONS

English Translation of the Written Opinion of the International Search Authority in international application No. PCT/CN2010/071213, mailed on Jun. 24, 2010.

* cited by examiner

METHOD FOR ESTABLISHING IDENTITY MANAGEMENT TRUST, IDENTIFICATION PROVIDER AND SERVICE PROVIDER

TECHNICAL FIELD

The present disclosure relates to the field of communications, in particular, to a method for establishing an Identity Management (IDM) trust, an Identification Provider (IDP) and a Service Provider (SP).

BACKGROUND

Concerning to a support from an SP for a limited IDP, if an IDP used by a user, i.e., an IDP to which the user attaches (such as IDP A), is not in the coverage which is supported by the current SP (such as SP1), the user authentication can not be completed; the authentication of the user can be completed only when the user is registered by using the IDPs (such as IDP B, C and D) which are supported by the SP, or when the user accesses an SP (such as SP2) which supports the IDP used by the user and provides similar services. This is inconsistent with the object of the IDM. However, it seems that it is impossible to unify the IDPs because of the respective benefit of the IDPs which are used currently.

IDM refers to administrating a life cycle (usage process) of a user identity and a relationship between the user identity and network application services, based on the network and related support technologies. For example, the IDM performs authentication or authorization for a user who accesses applications and resources, and the like. Currently, IDM systems are still located in a vertical structure and independent of each other, and most of these IDM systems are established for particular application services, wherein interconnection and intercommunication cannot be achieved between various IDM systems, and the sharing of user information (such as user's trust information, and authentication trust) cannot be achieved between various IDM systems.

Interoperation refers to the capability of performing mutual cooperation between various independent IDM systems and performing operations such as exchange and communication of valid information (such as user's trust information) and the like. The interoperation is established generally on the basis of mutual trust between IDM systems. The trust relationship establishment relationship between the current IDM systems is generally a one to one trust establishment, the trust relationship is generally static, and generally the IDM systems who have a trust relationship with each other is only within one trust domain (or in one union). The trust relationship establishment of cross trust domains (unions) and the trust relationship establishment based on trust chains (trust paths) can make the trust relationship of the current IDM systems expand to a lager scope, so that the trust relationship establishment is more dynamic, flexible and convenient.

Currently, an SP authentication mode which is primarily studied on are the mode based on invariable IDP, wherein if an IDP used by a user is not in the trust coverage of the SP, the user sometimes needs to log on different IDPs many times to obtain the service of a certain SP, which brings inconvenience to practical applications.

SUMMARY

Aim to the problem that: concerning to the SP authentication mode, wherein if an IDP used by a user is not in the trust coverage of the SP, the user sometimes needs to log on different IDPs many times to obtain the service of a certain SP, the main purpose of the present disclosure is to provide a method for establishing an IDM trust to solve the aforementioned problem.

In order to achieve the aforementioned purpose, a method for establishing an IDM trust is provided according to one aspect of the present disclosure.

The method for establishing an IDM trust according to the present disclosure comprises: after receiving an access from a user by an SP, determining by the SP whether an IDP to which the user attaches is located in a trust domain of the SP;

if the IDP to which the user attaches is not located in the trust domain of the SP, inquiring of IDPs in a local trust domain about the IDP to which the user attaches by the SP; and if the SP receives information of the IDP to which the user attaches, wherein the information is returned by an IDP in the local trust domain, adding the IDP to which the user attaches to a temporary trust list to establish a trust for the IDP to which the user attaches.

Preferably, the method may further comprises: after determining whether the IDP to which the user attaches is located in the trust domain of the SP, If the IDP to which the user attaches and the SP are located in a same trust domain, using by the SP a trust relationship related to the IDP to which the user attaches directly.

Preferably, the method may further comprises: after inquiring of the IDPs in the local trust domain about the IDP to which the user attaches by the SP, if information which is returned from an IDP located in the local trust domain is not received, determining whether all the inquired IDPs only belong to one trust domain;

if there is an IDP that belongs to two or more trust domains among the inquired IDPs, determining whether the IDP is located in a same trust domain with the IDP to which the user attaches; and if the inquired IDP and the IDP to which the user attaches are located in the same trust domain, establishing the trust for the IDP to which the user attaches.

Preferably, the method may further comprises: if information which is returned from an IDP located in the local trust domain is not received, if all the inquired IDPs are located in and only belong to one trust domain, stopping establishing the inquiry about the IDP to which the user attaches.

Preferably, the method may further comprises: if information which is returned from an IDP located in the local trust domain is not received, if there is an IDP that belongs to two or more trust domains among the inquired IDPs, continuing to send an inquiring request to the IDP which belongs to other trust domains.

Preferably, when the IDPs receive the inquiry, if a hop count of a multicast inquiry exceeds a set number, the trust may be stopped establishing.

In order to achieve the aforementioned purpose, an IDP and an SP are provided according to another aspect of the present disclosure.

The SP comprises: a receiving module, arranged to receive an access from a user; a determining module, arranged to determine whether an IDP to which the user attaches is located in a trust domain of the SP; a multicast module, arranged to inquire of IDPs in a local trust domain about the IDP to which the user attaches in a multicast mode, and search for and establish a trust path from the SP to the IDP to which the user attaches.

Preferably, the multicast module may further comprise: a multicast determining module, arranged to determine whether a count of the multicast exceeds a set number.

The IDP comprises: a multicast module, arranged to search for a path from an IDP to an IDP to which a user attaches.

In accordance to the present disclosure, the following method is adopted: after receiving an access from a user by an SP, determining by the SP whether an IDP to which the user attaches is located in a trust domain of the SP; if the IDP to which the user attaches is not located in the trust domain of the SP, inquiring of IDPs in a local trust domain about the IDP to which the user attaches by the SP; and if the SP receives information of the IDP to which the user attaches, wherein the information is returned by an IDP in the local trust domain, adding the IDP to which the user attaches to a temporary trust list to establish a trust for the IDP to which the user attaches. The following problem is solved: concerning to the SP authentication mode, wherein if an IDP used by a user is not in the trust coverage of the SP, the user cannot obtain desired services, which makes the user sometimes need to log on different IDPs many times to obtain the services of a certain SP. Furthermore, the present disclosure can establish a trust relationship between an SP and any IDP in case of adding or not adding extra devices, ensuring the user to obtain desired services after logging on for one time.

BRIEF DESCRIPTION OF THE DRAWINGS

The drawings illustrated herein are used to provide further understanding of the present disclosure, and constitute a part of the present application. The exemplary embodiments of the present disclosure and the description thereof are used to explain the present disclosure, rather than constituting an inappropriate limitation on the present disclosure, wherein.

DETAILED DESCRIPTION

It should be noted that, in the case where there is no conflict, the embodiments in the present application and features in these embodiments can be combined with each other. The present disclosure is described in detail referring to the attached drawings in combination with the embodiments hereinafter.

Method Embodiment

According to an embodiment of the present disclosure, a method for establishing an IDM trust is provided.

Figure 1:
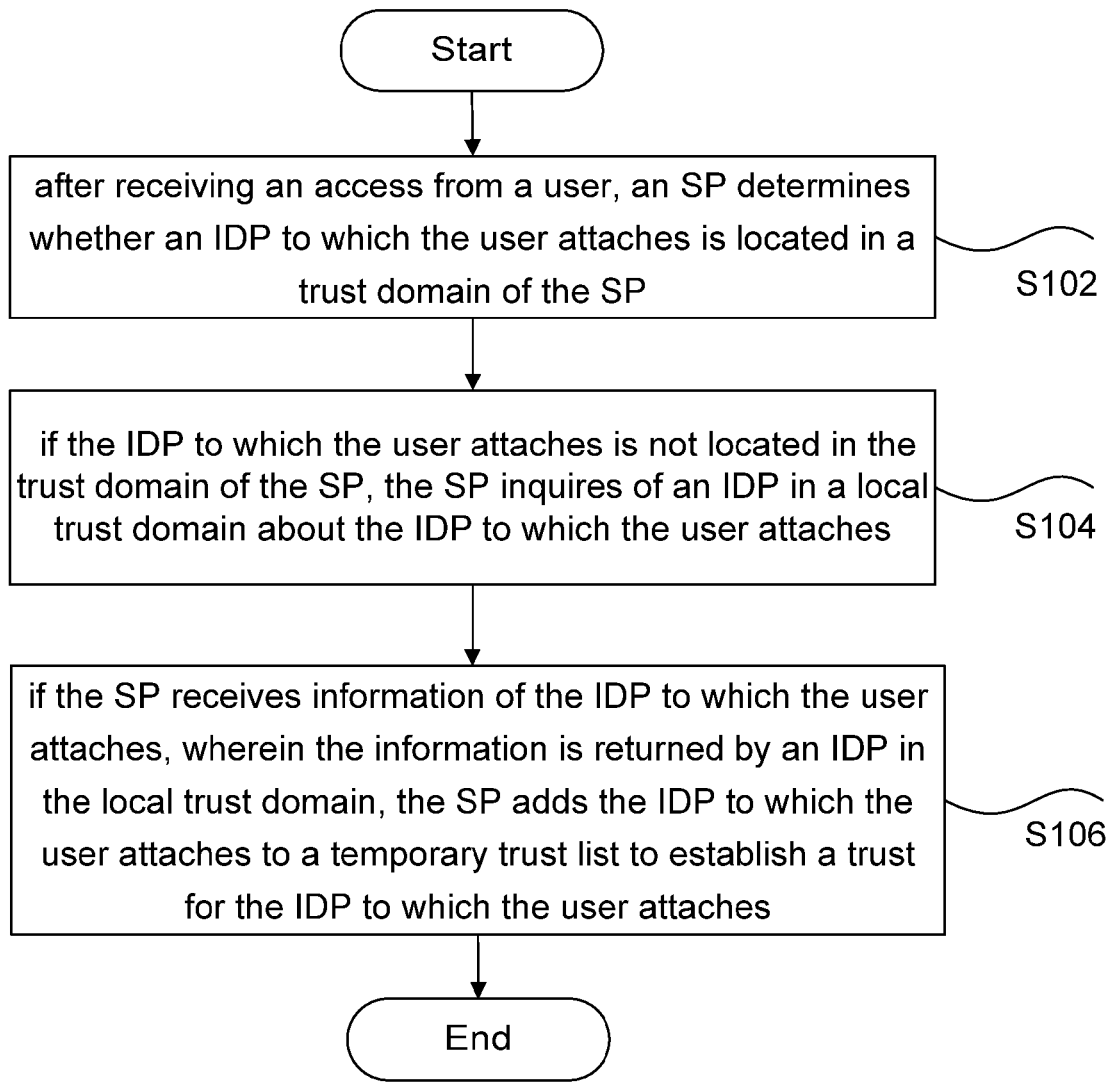
FIG. 1 is a flow diagram of a method for establishing an IDM trust according to an embodiment of present disclosure.

As shown in FIG. 1, the method comprises the following step 102 to step 106:

Step S102: after receiving an access from a user, an SP determines whether an IDP to which the user attaches (i.e., an IDP used by the user) is located in a trust domain of the SP;

Step S104: if the IDP to which the user attaches is not located in the trust domain of the SP, the SP inquires of an IDP in a local trust domain about the IDP to which the user attaches;

Step S106: if the SP receives information of the IDP (IDP A) to which the user attaches, wherein the information is returned by an IDP in the local trust domain, the SP adds the IDP to which the user attaches to a temporary trust list to establish a trust for the IDP to which the user attaches.

The trust domain means that if there has already been a trust relationship between the IDP and SP, the SP trusts the identity authentication information from the IDP, and performs authentication.

The implementation process of the embodiment of the present disclosure is described in detail in combination with the examples hereinafter.

Figure 2:
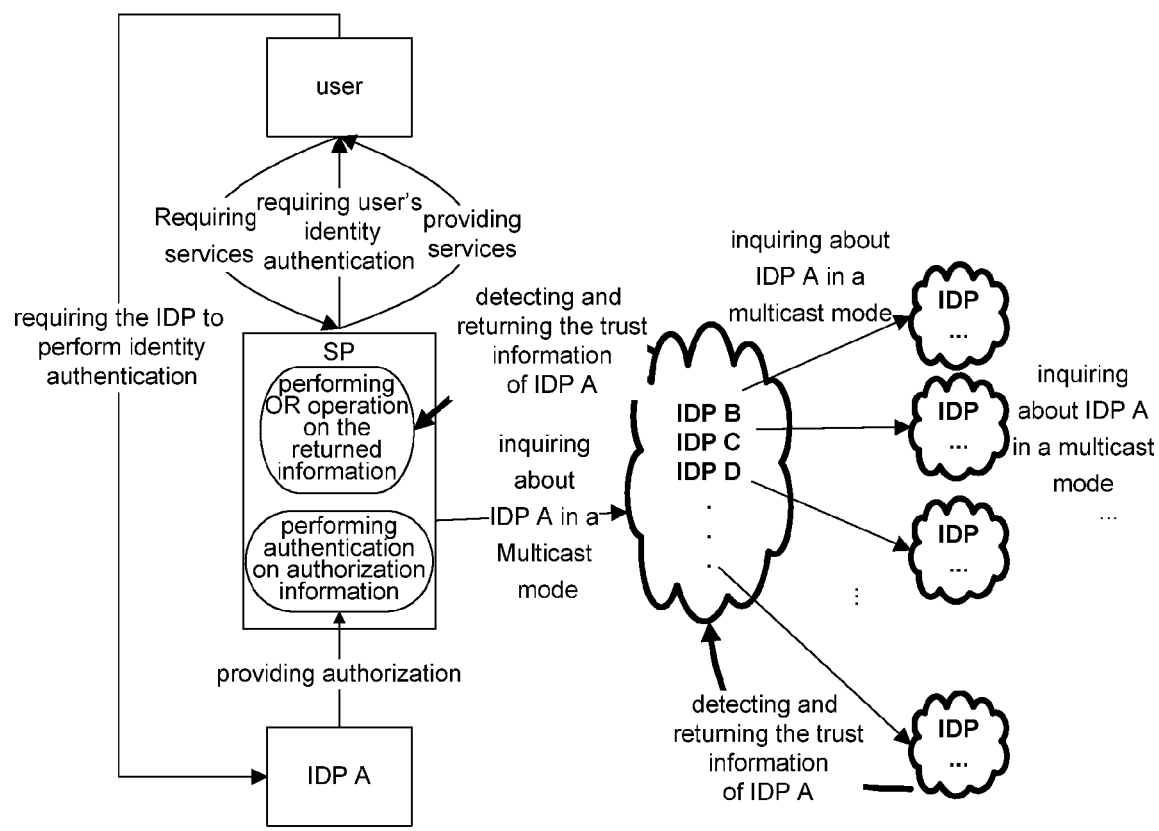
FIG. 2 is a schematic diagram based on an IDP multicast mode according to an embodiment of present disclosure.

FIG. 2 is a structural diagram based on a multicast mode of an SP and a multicast mode of an IDP, which shows the process of IDP detection and trust establishment under the user's request. When IDP A used by the user is in the trust domain of the SP, the identity authentication is performed, in which the SP requires the user to perform identity authentication, the user requires IDP A to perform identity authentication, IDP A transmits authorization information to the SP, the SP performs authentication on the authorization information and determines whether to provide services for the user. If IDP A used by the user is not in the trust domain of SP, the SP inquiries of IDPs in the trust domain in a multicast mode. If the trust information of IDP A is obtained, the trust information is returned to the SP, and identity authentication is performed; otherwise, an IDP which receives the inquiry and is located in a plurality of trust domains continue to inquiry of IDPs in the adjacent domains in a multicast mode, until the hop count of the multicast achieves the limitation, or until there is no domain for multicast, or until IDP A is detected. If IDP A is detected, the trust information backtracks. SP performs OR processing on all returned possible information, and then the process of identity authentication is entered. Under this architecture, if the IDP originally is not in the trust domain of the SP, the trust relationship established between the SP and the IDP by this method is temporary, and when the service is completed, the trust relationship is released. The basis of establishing this temporary trust relationship is that, the process of establishing trust is based on transferability of IDP based trust. Without RS, the trust relationship between various trusted objects is established on the basis of trust protocol which is signed by each trusted object and the trust relationship is invariable, this means that such trust relationship is reliable and transmissible, and various IDP nodes in the trust transmission can form an IDP trust path. By making an IDP trust path as a medium, the trust of the SP in the IDP used by the user is established. Under the authorization of the user, the trust of the IDP in the SP is established, during this process, the intermediate IDP becomes a trust medium.

Figure 3:
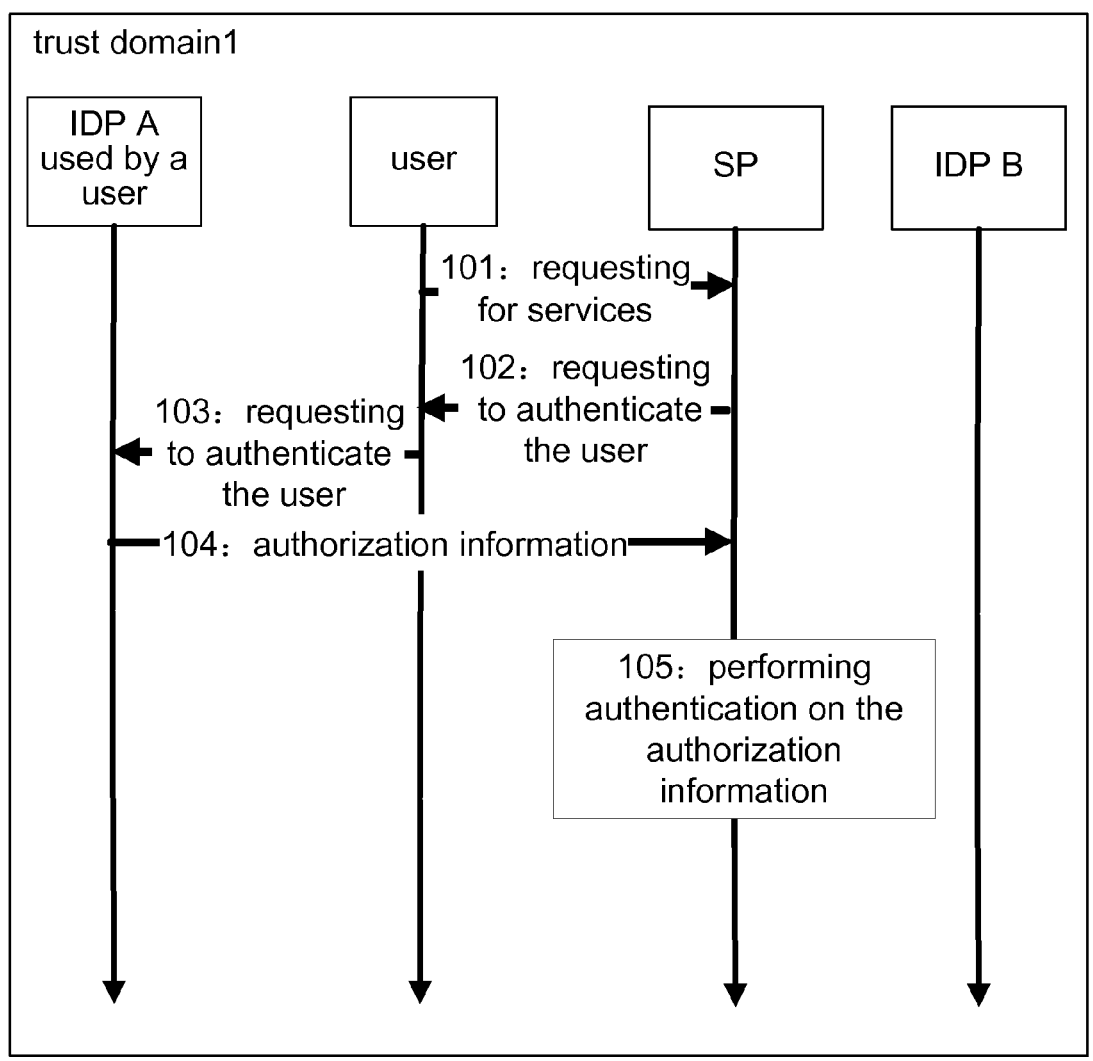
FIG. 3 is a flow diagram of a first case based on an IDP multicast mode without RS according to an embodiment of present disclosure.
Figure 4:
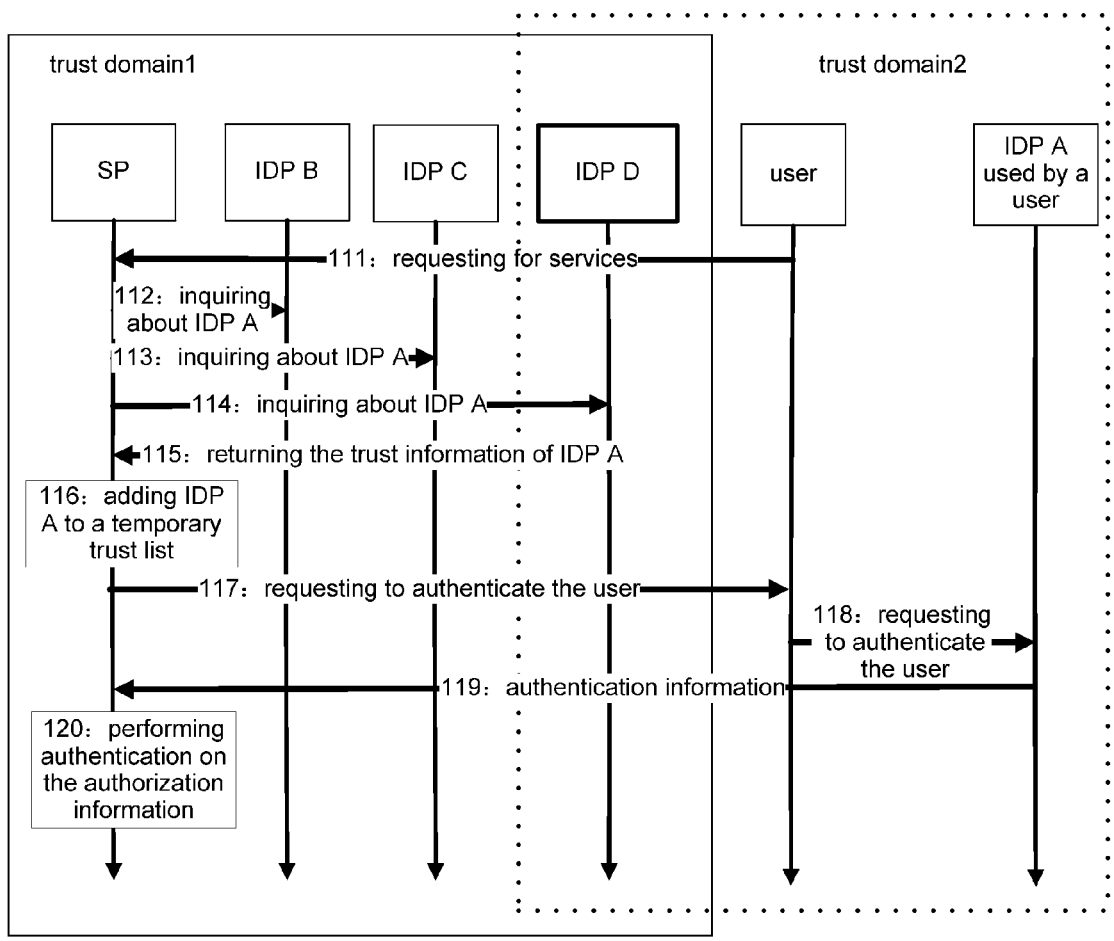
FIG. 4 is a flow diagram of a second case based on an IDP multicast mode without RS according to an embodiment of present disclosure.
Figure 5:
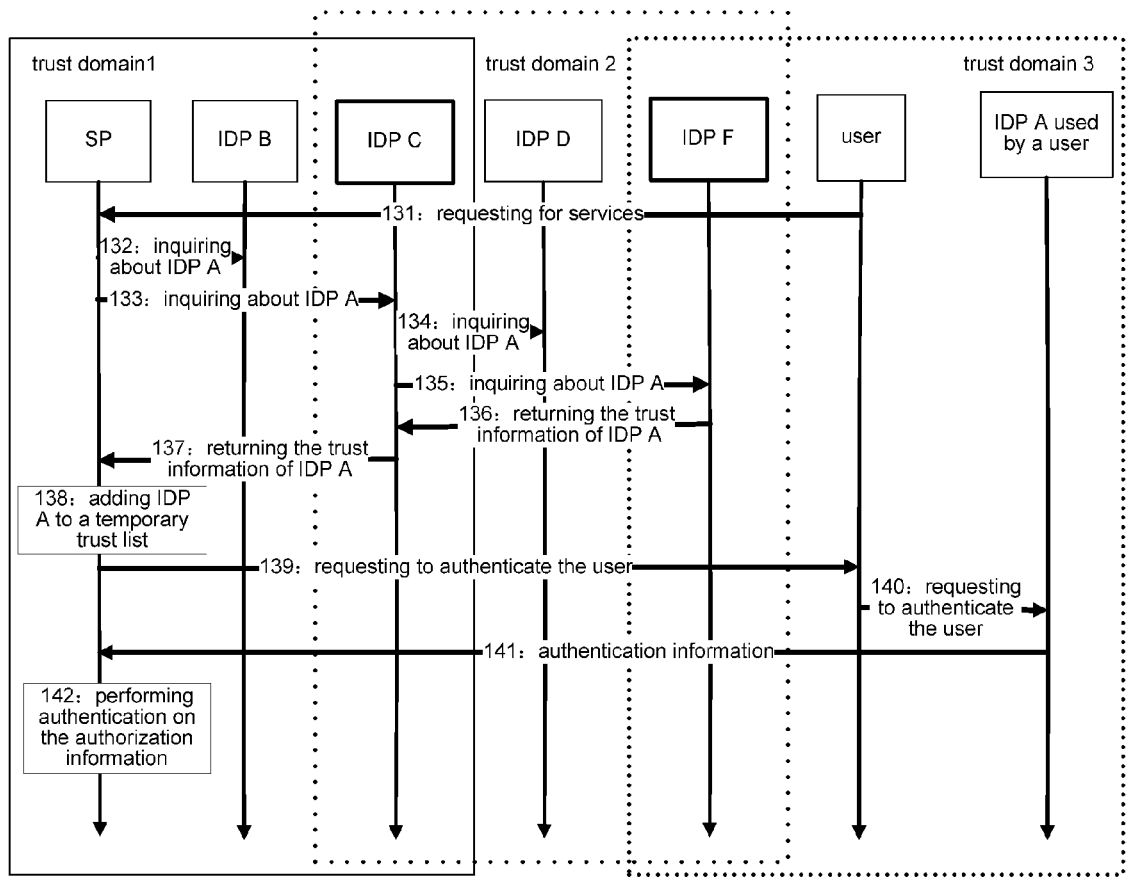
FIG. 5 is a flow diagram of a third case based on an IDP multicast mode without RS according to an embodiment of present disclosure.

FIGS. 3-5 show three cases of IDP detection and trust establishment based on the multicast mode of both the SP and the IDP, and each case can be divided into two processes, i.e., detection process and trust establishment process, as described in detail hereafter.

FIG. 3 shows the case where IDP A is located in the trust domain of an SP, the case primarily comprises the following steps.

The detection process comprises:

Step 101: a user requests the SP to provide services. As IDP A used by the user is located in the trust domain of the SP, IDP A is detected without performing multicast.

Trust establishment process comprises:

Step 102: the SP requests the user to perform identity authentication;

Step 103: the user requires IDP A to perform identity authentication;

Step 104: IDP A provides the user's authorization information to the SP;

Step 105: the SP performs authorization and authentication on the user according to the authorization information. If the authorization information can not be accepted, the trust establishment fails, and the SP denies providing services. If the authorization information is accepted, a bi-directional trust relationship is established (but this trust relationship is not an intermediate trust relationship).

FIG. 4 shows the case where IDP A and an SP are located in different trust domains but both of the trust domains in which IDP A and the SP are located have a common IDP, the case primarily comprises the following steps.

The detection process comprises:

Step 111: the user requests the SP to provide services;

Steps 112-114: as IDP A used by the user is not located in the trust domain of the SP, the SP inquires of all IDPs in the trust domain to which the SP attaches about IDP A in a multicast mode according to a trust list. Steps 112-114 are one unity of the multicast;

Step 115: as IDP D attaches to trust domain 1 and trust domain 2 (the trust domain to which IDP A used by the user attaches), the trust list of IDP D has both the objects (including IDP A) of trust domain 1 and the objects of trust domain 2. Thus, IDP A is detected and the trust information of IDP A is returned.

Trust establishment process comprises:

Step 116: IDP A is added to a temporary trust list according to the trust information of IDP A returned in Step 115;

Step 117: the SP requests the user to perform identity authentication;

Step 118: the user requires IDP A to perform identity authentication;

Step 119: IDP A provides the user's identity authorization information to the SP;

Step 120: the SP performs authorization and authentication on the user according to the identity authorization information. If the identity authorization information can not be accepted, the trust establishment fails, and the SP denies providing services. If the authorization information is accepted, a bi-directional trust relationship which takes the IDP as a medium is established.

FIG. 5 shows the case where IDP A and the SP are not in a same trust domain and both of the trust domains in which IDP A and the SP are located do not have a common IDP, but there is an IDP trust path from the SP to IDP A, the case primarily comprises the following steps.

The detection process comprises:

Step 131: the user requests the SP to provide services;

Steps 132-133: as IDP A used by the user is not located in the trust domain of the SP, the SP inquires of all IDPs in the trust domain to which the SP attaches about IDP A in a multicast mode according to a trust list. Steps 122-123 are one unity of the multicast;

Steps 134-135: as IDP C attaches to trust domain 1 and trust domain 2 and IDP A is not in the trust domain 2, IDP C performs multicast on the IDPs in the trust domains except trust domain 1 which inquires about IDP A, i.e., performing multicast on IDP D and IDP F;

Step 136: as IDP F attaches to trust domain 2 and trust domain 3 (the trust domain to which IDP A attaches), the IDP F has the trust information of IDP A. Thus, the detection process ends, and the trust information of IDP A backtracks;

Step 137: IDP C returns the trust information of IDP A to the SP.

Trust establishment process comprises:

Step 138: the SP adds IDP A to a temporary trust list according to the trust information of IDP A returned in Step 137;

Step 139: the SP requests the user to perform identity authentication;

Step 140: the user requires IDP A to perform identity authentication;

Step 141: IDP A provides the user's identity authorization information to the SP;

Step 142: the SP performs authorization and authentication on the user according to the identity authorization information. If the identity authorization information can not be accepted, the trust establishment fails, and the SP denies providing services. If the authorization information is accepted, a bi-directional trust relationship which takes the IDP as a medium is established.

The aforementioned preferable embodiments establish to the utmost extent the trust relationship between the SP and the IDP to which the user attaches (i.e., the IDP used by the user) in case of not adding any extra device, thus enabling a user to obtain desired services after logging on for one time.

Figure 6:
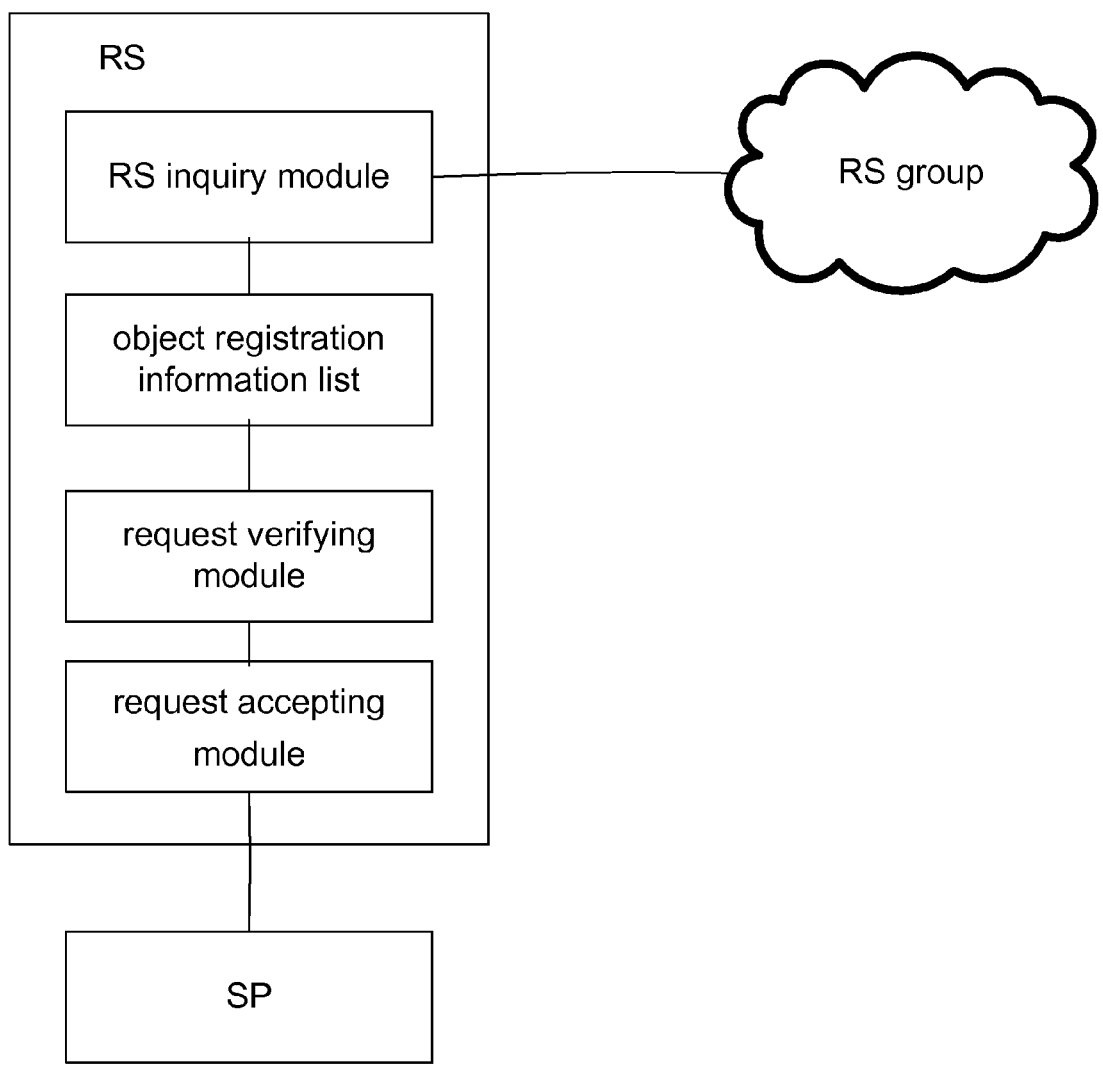
FIG. 6 is an architecture diagram of a Registration Server (RS) according to an embodiment of present disclosure.

FIG. 6 is an architecture diagram of an RS. Without RS, there may be cases where there is no trust transmission path from an SP to an IDP used by the user in the SP and IDP based multicast, in such cases services cannot be provided. Therefore, such problem can be solved by adding RS devices, so as to completely enable a user to obtain desired services after logging on for one time. An RS layer is above an IDP layer, the RS layer is maintained by an operating and verification institution of the SP and the IDP. If an IDP is to be established, the RS has to register in its local registration institution first, and the registration institution adds information such as the registration, trust, address of the corresponding IDP and the RS to which the IDP attaches to the RS. For these functions, a request accepting module for processing the request from the SP or from the RS needs to be set in the RS, and a request verifying module for examining the requests also needs to be set in the RS. When the verification is passed, an object registration information list module for administrating the registration information list is needed. When the IDP is not detected in the local registration information list, an RS inquiry module for performing multicasting an RS group is needed.

Figure 7:
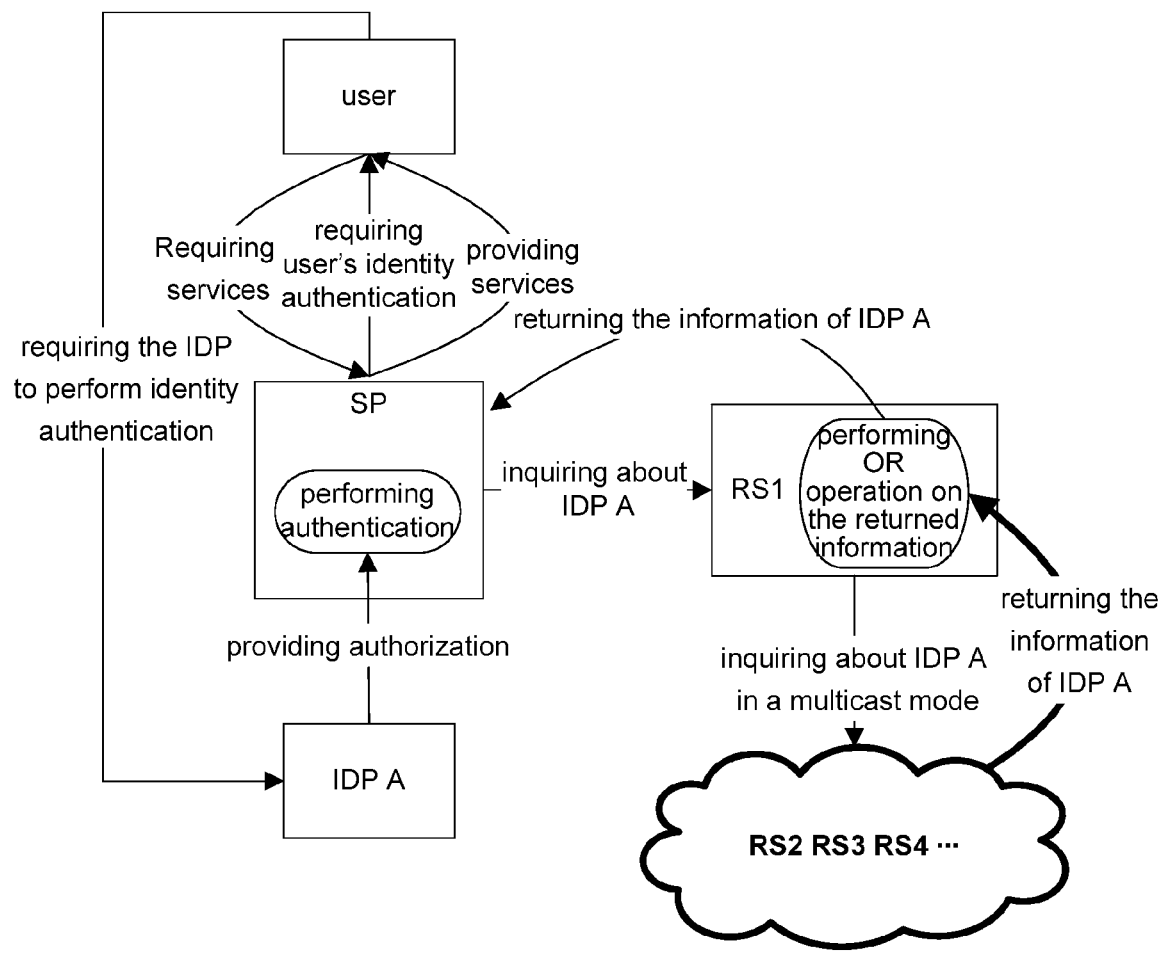
FIG. 7 is a flow diagram of searching for an IDP based on an RS according to an embodiment of present disclosure.

FIG. 7 is an architecture diagram of a scheme for searching for an IDP based on an RS, which shows a structure for performing user detection and trust establishment with the existence of RS devices. When the user requests SP services, if IDP A used by the user is located in the trust domain of the SP, the SP enters the identity identification process, the SP requests the user to perform identity authentication, the user requires IDP A to perform identity authentication, IDP A sends authorization information to the SP, and the SP performs authentication and authorization on the user. If the authentication information is accepted, services are provided, otherwise, the SP denies providing services. When IDP A is not in the trust domain of the SP, the SP inquires of an RS in the local area, and the RS queries the registration list. If the trust information of IDP A is detected, the trust information of IDP A is returned to the SP, and the SP enters the process of identity authentication. If the trust information of IDP A is not detected by the RS in the local area, the RS broadcast inquiry to an RS group, and then performs OR operation on all returned results, and returns one piece of trust information to the SP, and the SP enters the process of identity authentication. In this structure, only the RS has the function of broadcast, the SP and the IDP do not need the function of multicast any more. However, the SP still needs one trust list, to determine the IDP and related information in the trust domain. Different from the case in FIG. 2, the IDP does not invariably attach to a certain trust domain any more, each IDP is invariably administrated by a certain RS, and the coverage of the trust domain of the SP may be dynamically changed, even spanning different areas. However, the RS which can be inquired by the SP is only the RS to which the SP attaches. During the process of continuous inquiry, the SP can continually establish the long term trust relationship with a new IDP dynamically. Meanwhile, there must be a response to the inquiry from the SP to RS, so that the IDP used by the user can certainly be detected. Meanwhile, if the RS perform broadcast on the RS group, the RS waits for the responses from all the RSs after the broadcast, and returns a result to the SP instead of informing the SP of the response from each RS after performing the OR operation. During this process, each SP and each IDP signs agreement with RS institution when registering, the RS institution is responsible for supervising the trusted object and is used as a trust medium or guarantee.

Figure 8:
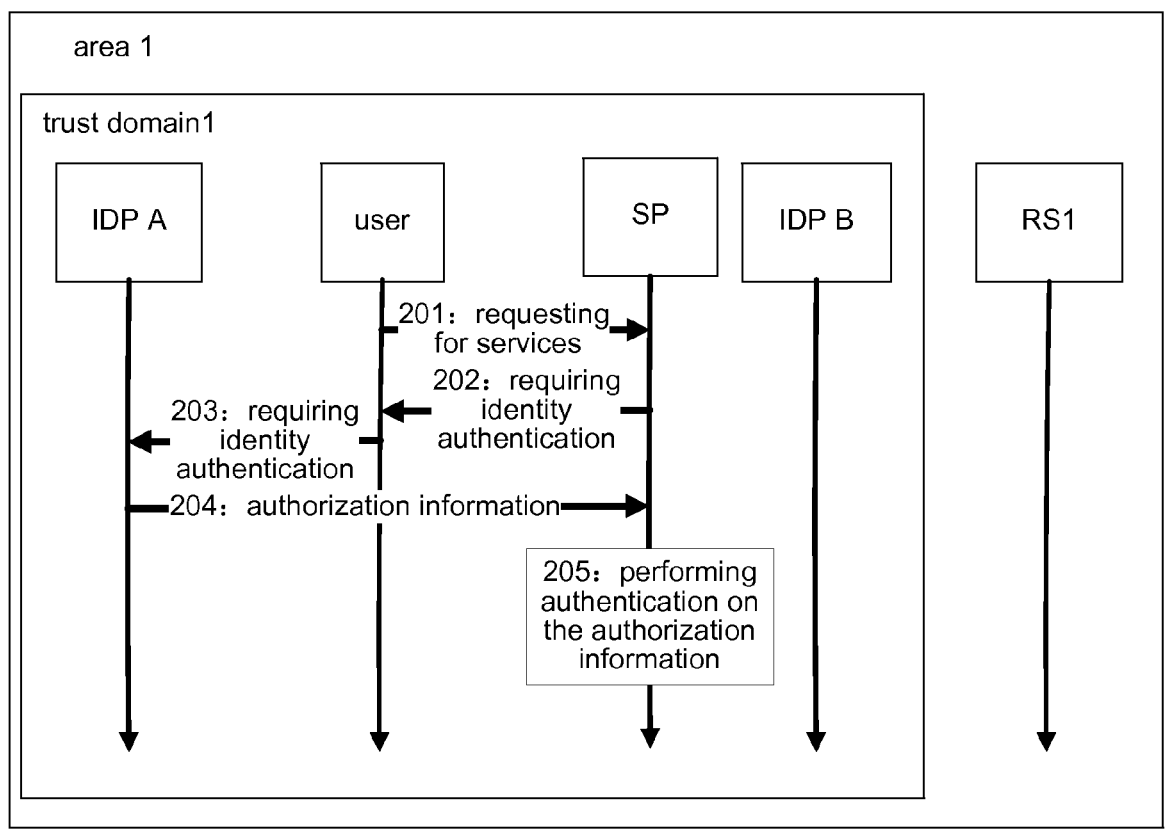
FIG. 8 is a flow diagram of a first case of a method for searching for an IDP based on RS with RS according to an embodiment of present disclosure.
Figure 9:
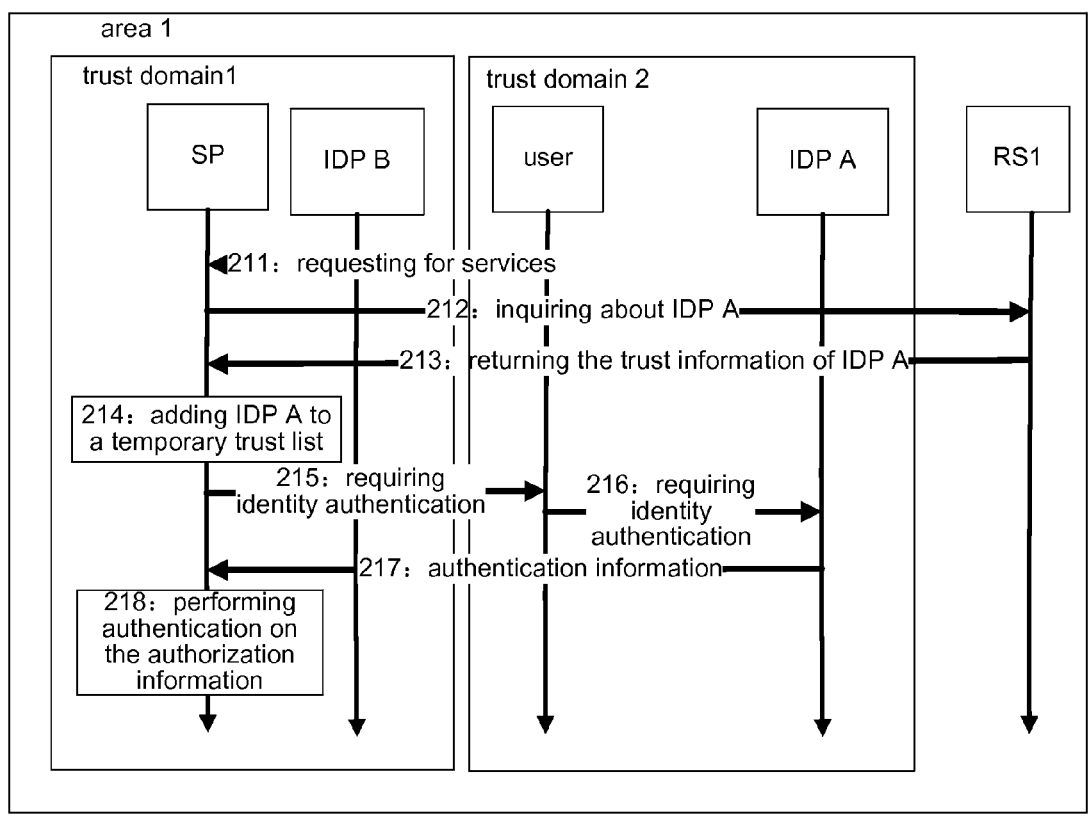
FIG. 9 is a flow diagram of a second case of a method for searching for an IDP based on RS with RS according to an embodiment of present disclosure.
Figure 10:
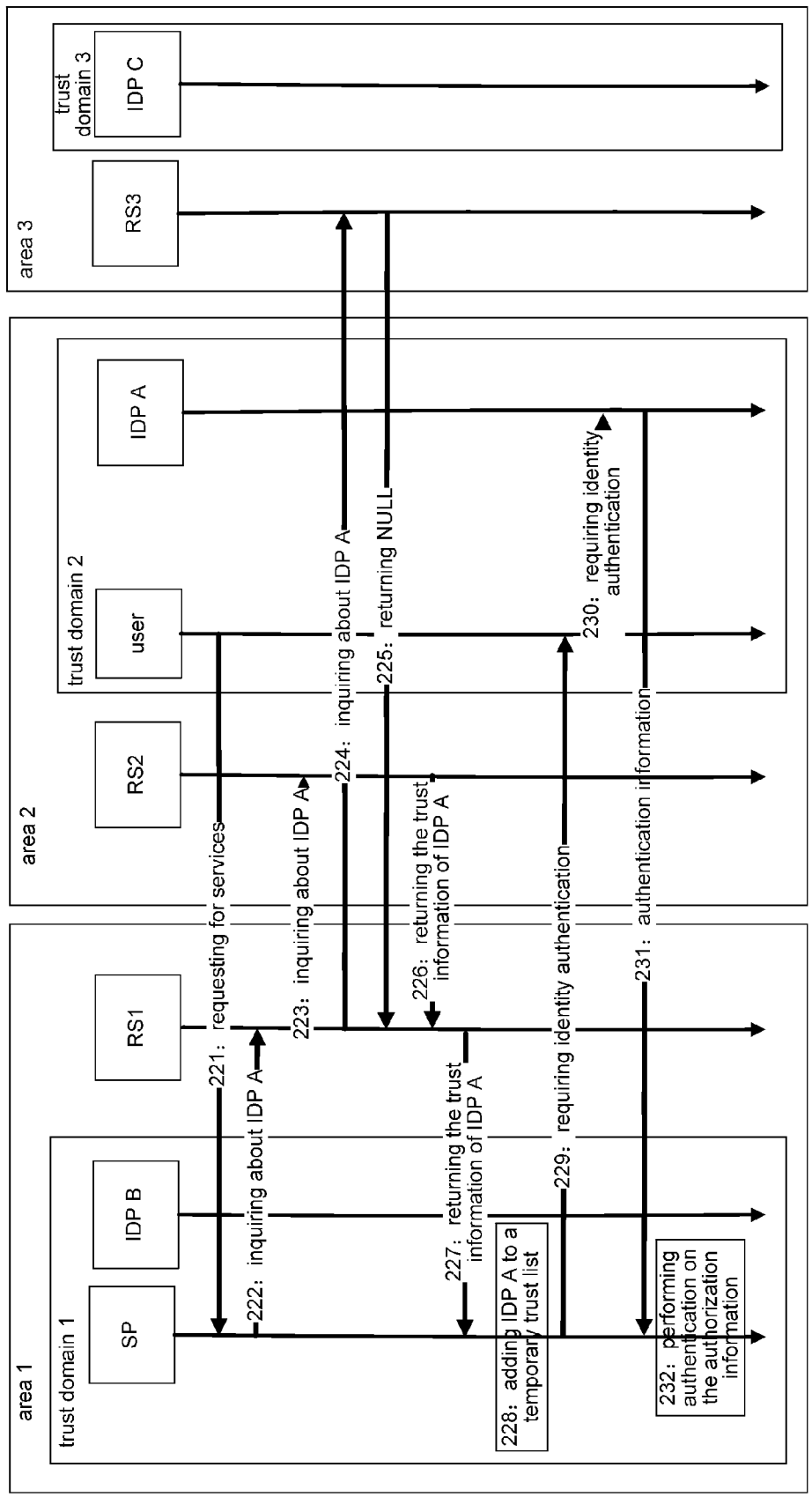
FIG. 10 is a flow diagram of a third case of a method for searching for an IDP based on RS with RS according to an embodiment of present disclosure.

FIGS. 8-10 shows three cases of IDP detection and trust establishment in the presence of RS architecture, and each case can be divided into two processes, i.e., IDP detection and trust establishment, as described in detail hereafter.

FIG. 8 shows a case where an SP and IDP A used by the user are in the same trust domain in the presence of an RS architecture, the case primarily comprises the following steps.

The detection process comprises:
Step 201: a user requests the SP to provide services. As IDP A used by the user is located in the trust domain of the SP, IDP A is detected without performing multicast.

Trust establishment process comprises:
Step 202: as there has been a trust from the SP in IDP A, the SP sends an identity authentication request to the user;
Step 203: the user requires IDP A to perform identity authentication;
Step 204: IDP A provides the user's authorization information to the SP;
Step 205: the SP performs authentication on the user's authorization information. If the information can not be accepted, the trust establishment fails, and the SP denies providing services. If the information is accepted, the mutual trust relationship is established.

FIG. 9 shows the case that an SP and IDP A used by the user are not in the same trust domain in the presence of an RS architecture but the SP and IDP A belong to the same area, the case primarily comprises the following steps.

The detection process comprises:
Step 211: the user requests the SP to provide services;
Step 212: as IDP A is not in a trust list of the SP, the SP sends an inquiry to an RS (RS1) in area 1 about IDP A;
Step 213: as IDP A is in area 1, RS1 returns the trust information of IDP A to the SP. Thus, the detection process ends.

Trust establishment process comprises:
Step 214: the SP adds the IDP A to the trust list;
Step 215: the SP establishes a trust in IDP A, and sends an identity authentication request to the user;
Step 216: the user requires the IDP A to perform identity authentication;
Step 217: the IDP A sends user's authorization information to the SP;
Step 218: the SP performs authentication on the user's authorization information. If the information can not be accepted, the trust establishment fails, and the SP denies providing services. If the information is accepted, the mutual trust relationship is established.

FIG. 10 shows the case where an SP and IDP A used by the user are not in the same trust domain in the presence of an RS architecture and the SP and IDP A do not belong to the same area, the case primarily comprises the following steps.

The detection process comprises:
Step 221: the user requests the SP to provide services;
Step 222: as IDP A is not in a trust list of the SP, the SP sends an inquiry to an RS (RS1) in area 1 about IDP A;
Steps 223-224: as IDP A is not in area 1, RS1 sends the inquiry to all RSs about IDP A. Steps 223-224 are a broadcast process;
Step 225: as IDP A is not in area 3, RS3 returns NULL which represents that nothing is detected;
Step 226: as IDP A is in area 2, RS2 returns the trust information of IDP A to the RS1;
Step 227: after the OR operation, RS1 returns the trust information of IDP A to the SP, thus the detection process ends.

Trust establishment process comprises:
Step 228: the SP adds IDP A to the trust list;
Step 229: after the trust in IDP A is established by the SP, the SP sends an identity authentication request to the user;
Step 230: the user requires IDP A to perform identity authentication;
Step 231: the IDP A sends the user's authorization information to the SP;
Step 232: the SP performs authentication on the user's authorization information. If the information can not be accepted, the trust establishment fails, and the SP denies providing services. If the information is accepted, the mutual trust relationship is established.

The aforementioned embodiments establish a trust relationship between an SP and any IDP in case of adding extra devices, ensuring the user to obtain desired services after logging on for one time.

The aforementioned area refers to an area combined by all the SPs and IDPs administered by the RSs (registration server) in the registered place where the SP or the IDP is located when the SP or the IDP applies for registration. In addition, the IDP and the SP may be in different area, but the IDP is in the trust domain of the SP.

Apparatus Embodiment

According to an embodiment of the present disclosure, an identification provider and a service provider are provided.

Figure 11:
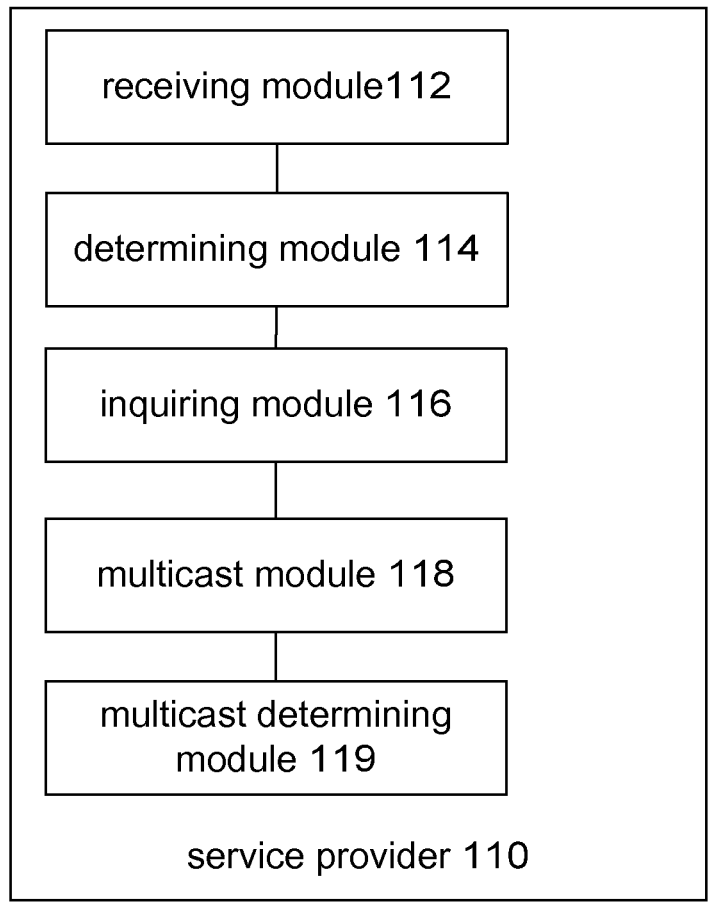
FIG. 11 is a schematic diagram of a service provider according to an embodiment of present disclosure.

FIG. 11 is a schematic diagram of the service provider according to an embodiment of present disclosure.

As shown in FIG. 11, the service provider 110 comprises: a receiving module 112, a determining module 114, an inquiring module 116 and a multicast module 118.

The receiving module 112 is arranged to receive an access from a user; the determining module 114 is arranged to determine whether an IDP to which the user attaches is located in a trust domain of the SP; the inquiring module 116 is arranged to inquire of IDPs in a local trust domain about the IDP to which the user attaches in a multicast mode; the multicast module 118 is arranged to search for and establish a trust path from the SP to the identification provider (IDP A) to which the user attaches.

Preferably, the service provider 110 further comprises: a multicast determining module 119, which is arranged to determine whether a count of the multicast exceeds a set number.

Figure 12:
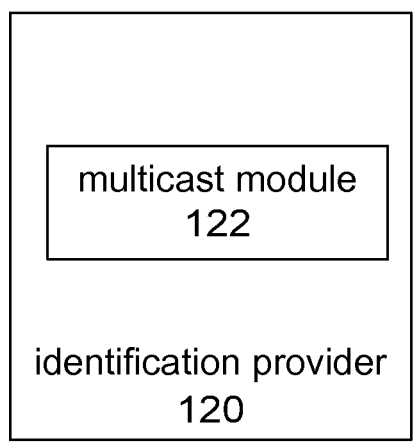
FIG. 12 is a schematic diagram of an identification provider according to an embodiment of present disclosure.

FIG. 12 is a schematic diagram of the identification provider according to an embodiment of present disclosure.

As shown in FIG. 12, the identification provider 120 comprises a multicast module 122.

In particular, the multicast module 122 is arranged to search for a path from an IDP to an identification provider (IDP A) to which a user attaches.

It can be seen from the aforementioned description that the present disclosure establishes a trust relationship from an SP to any IDP in case of adding or not adding extra devices, ensuring the user to obtain desired services after logging on for one time.

The description aforementioned is only preferred embodiments of the present disclosure and is not intended to limit the present disclosure. For those skilled in the art, various alterations and changes can be applied to the present disclosure. Any modification, equivalent replacement and improvement etc. within the principle of the present disclosure should be defined in the protection scope of the present disclosure.

The invention claimed is:

1. A method for establishing an Identity Management (IDM) trust comprising:
    receiving, by a Service Provider (SP), a service request from a user;
    determining, by the SP, whether an Identification Provider (IDP) to which the user attaches is located in a trust domain of the SP, wherein the trust domain of the SP is called as a first trust domain;
    in the case that the IDP to which the user attaches is not located in the first trust domain, by the SP, inquiring of IDPs which are in the first trust domain about the IDP to which the user attaches;
    determining a first IDP of the IDPs is not only in the first trust domain, but also in a second trust domain where the IDP to which the user attaches is located, so as to determine that the first IDP has information of the IDP to which the user attaches;
    sending, by the first IDP, the information of the IDP to which the user attaches to the SP;
    adding, by the SP, the IDP to which the user attaches to a temporary trust list to establish a trust for the IDP to which the user attaches, so that the SP, the user, and the IDP to which the user attaches can communicate directly without via any intermediate IDPs;
    sending, by the SP, an identity authentication request to the user;
    requesting, by the user, the IDP to which the user attaches to perform identity authentication on the user;
    sending, by the IDP to which the user attaches, the user identity authentication information to the SP; and
    performing, by the SP, authorization on the user according to the user's identity authentication information, so as to determine whether to provide a service to the user.

2. The method according to claim 1, further comprising: after determining whether the IDP to which the user attaches is located in the first domain,
    if the IDP to which the user attaches and the SP are located in a same trust domain, using by the SP a trust relationship related to the IDP to which the user attaches directly.

3. A method for establishing an Identity Management (IDM) trust comprising;
    receiving, by a Service Provider (SP), a service request from a user;
    determining, by the SP, whether an Identification Provider (IDP) to which the user attaches is located in a trust domain of the SP, wherein the trust domain of the SP is called as a first trust domain;
    in the case that the IDP to which the user attaches is not located in the first trust domain, by the SP, inquiring of IDPs which are in the first trust domain about the IDP to which the user attaches;
    determining none of the IDPs which are in the trust domain is in a third trust domain where the IDP to which the user attaches is located,
    determining that a first IDP of the IDPs in the first domain is also located in a second trust domain;
    by the first IDP, inquiring of the IDPs which are in the second trust domain about the IDP to which the user attaches,
    determining, whether a second IDP of the IDPs which are in the second trust domain is also in the third domain;
    in the case the second IDP is not only in the second trust domain, but also in the third trust domain, determining that the second IDP has information of the IDP to which the user attaches;
    sending, by the second IDP, the information of the IDP to which the user attaches to the first IDP;
    forwarding, by the first IDP, the information of the IDP to which the user attaches to the SP;
    adding, by the SP, the IDP to which the user attaches to a temporary trust list to establish a trust for the IDP to which the user attaches, so that the SP, the user, and the IDP to which the user attaches can communicate directly without via any intermediate IDPs;
    sending, by the SP, an identity authentication request to the user;
    requesting, by the user, the IDP to which the user attaches to perform identity authentication on the user;
    sending, by the IDP to which the user attaches, the user's identity authentication information to the SP; and
    performing, by the SP, authorization on the user according to the user's identity authentication information, so as to determine whether to provide a service to the user.

4. The method according to claim 3, further comprising: in the case the second IDP in the second trust domain is not in the third domain, but in a fourth domain,
    by the second IDP, inquiring of IDPs which are in the fourth trust domain about the IDP to which the user attaches,
    until determining a subsequent IDP is in the third domain, returning, by the subsequent IDP, the information of the IDP to which the user attaches to the SP through backtracking.

5. The method according to claim 1, wherein when the IDPs receive the inquiry, if a hop count of a multicast inquiry exceeds a set number stopping establishing the trust.

6. The method according to claim 2, wherein when the IDPs receive the inquiry, if a hop count of a multicast inquiry exceeds a set number stopping establishing the trust.

7. The method according to claim 3, wherein when the IDPs receive the inquiry, if a hop count of a multicast inquiry exceeds a set number stopping establishing the trust.

8. The method according to claim 4, wherein when the IDPs receive the inquiry, if a hop count of a multicast inquiry exceeds a set number stopping establishing the trust.

\* \* \* \* \*